Figure 1:
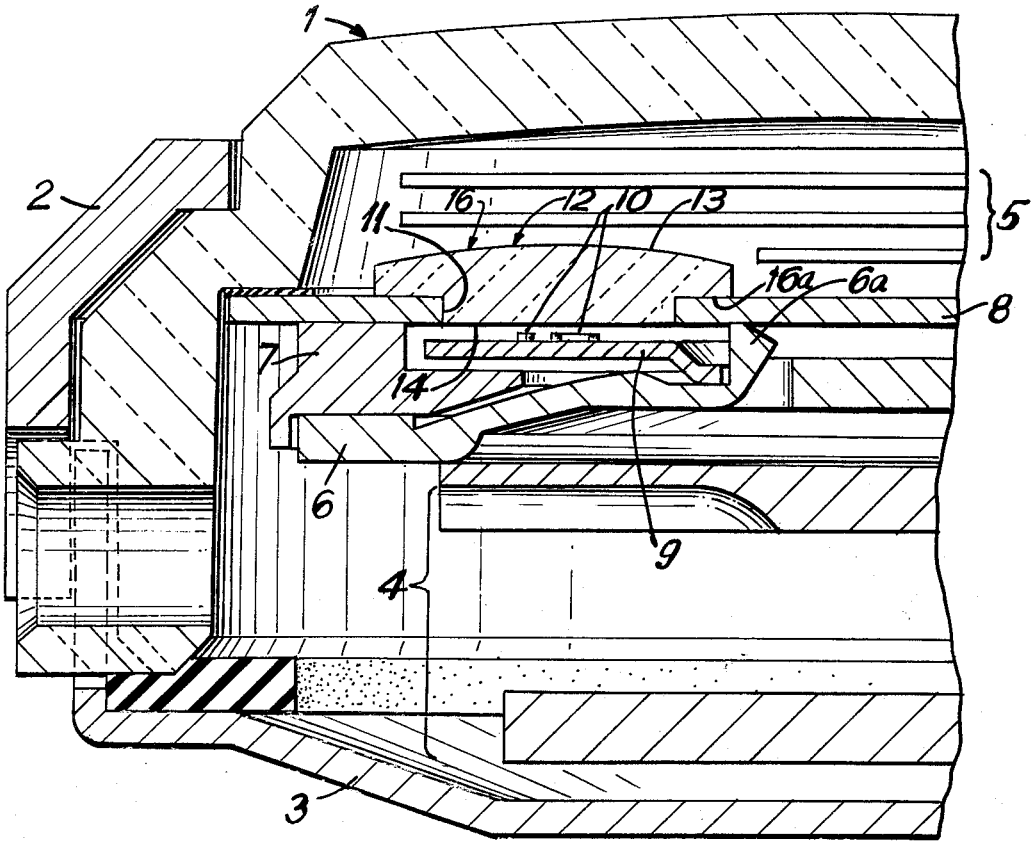
Figure 2:
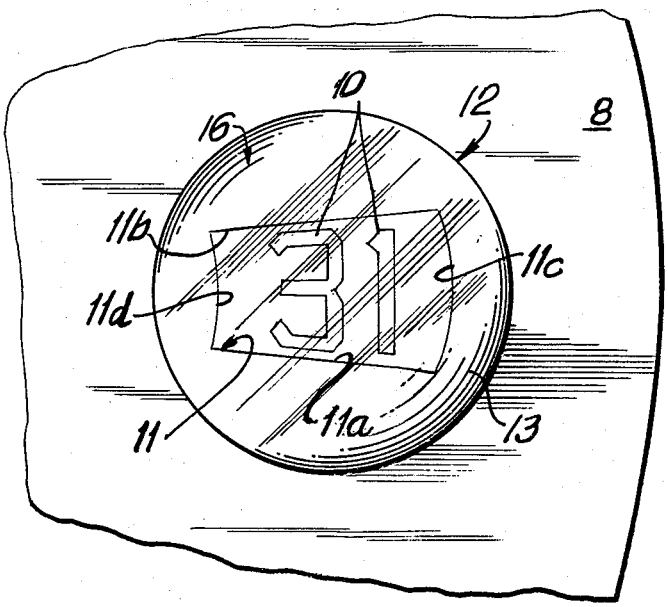
Figure 3:
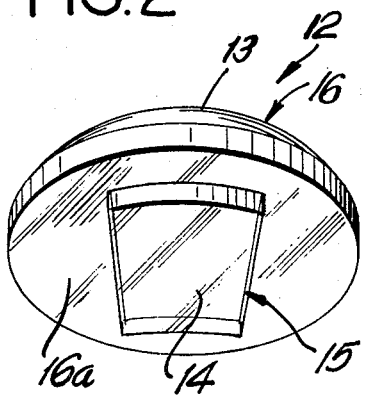

United States Defensive Publication [19] (H) [11] T103,802

Rinaldi [43] Jan. 3, 1984

[54] MAGNIFICATION LENS FOR DATE DIAL IN A WRISTWATCH

[76] Inventor: Joseph Rinaldi, 38 Old Colony Dr., Watertown, Conn. 06795

[21] Appl. No.: 423,887

[22] Filed: Sep. 27, 1982

[51] Int. Cl.[3] ..... G02B 27/02
[52] U.S. Cl. ..... 350/114

[57] ABSTRACT

A magnification lens (12) is disclosed which fits into and is retained in a window (11) in the dial of a calendar wristwatch and is arranged to magnify indicia (10) on a date ring rotatable beneath the window.

4 Claims, 1 Sheet Drawing,

7 Pages Specification

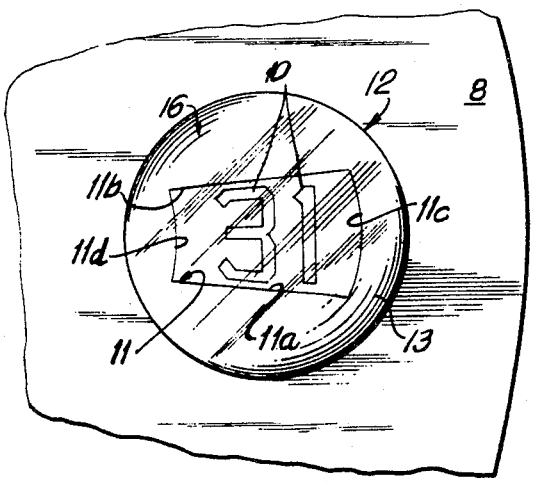

The file of this unexamined application may be inspected and copies thereof may be purchased (849 O.G. 1221, Apr. 9, 1968).